United States Patent
Fidrich et al.

(10) Patent No.: US 7,545,979 B2
(45) Date of Patent: Jun. 9, 2009

(54) METHOD AND SYSTEM FOR AUTOMATICALLY SEGMENTING ORGANS FROM THREE DIMENSIONAL COMPUTED TOMOGRAPHY IMAGES

(75) Inventors: Marta Fidrich, Szeged (HU); Eors Mate, Szeged (HU); Laszlo G Nyul, Szeged (HU); Attila Kuba, Szeged (HU); Bence Kiss, Miskolc (HU)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 10/907,690

(22) Filed: Apr. 12, 2005

(65) Prior Publication Data

US 2006/0228009 A1    Oct. 12, 2006

(51) Int. Cl.
G06K 9/00    (2006.01)
G06K 9/34    (2006.01)
(52) U.S. Cl. .................. 382/173; 382/128; 382/131
(58) Field of Classification Search ............. 382/128, 382/131, 173; 345/419, 420, 423, 424
See application file for complete search history.

(56) References Cited

U.S. PATENT DOCUMENTS

| | | | | |
|---|---|---|---|---|
| 5,204,920 | A * | 4/1993 | Moran et al. | 382/166 |
| 5,859,891 | A | 1/1999 | Hibbard | 378/62 |
| 5,926,568 | A | 7/1999 | Chaney et al. | 382/217 |
| 6,169,817 | B1 * | 1/2001 | Parker et al. | 382/131 |
| 6,249,594 | B1 | 6/2001 | Hibbard | 382/128 |
| 6,362,821 | B1 * | 3/2002 | Gibson et al. | 345/424 |
| 6,492,986 | B1 * | 12/2002 | Metaxas et al. | 345/420 |
| 6,690,816 | B2 * | 2/2004 | Aylward et al. | 382/128 |
| 2002/0136440 | A1 * | 9/2002 | Yim et al. | 382/131 |
| 2002/0159638 | A1 * | 10/2002 | Ratner et al. | 382/199 |
| 2004/0153128 | A1 * | 8/2004 | Suresh et al. | 607/14 |
| 2005/0078857 | A1 * | 4/2005 | Park | 382/128 |
| 2005/0123197 | A1 * | 6/2005 | Tank | 382/173 |
| 2005/0286750 | A1 * | 12/2005 | Dehmeshki | 382/131 |
| 2006/0098007 | A1 * | 5/2006 | Rouet et al. | 345/419 |

(Continued)

FOREIGN PATENT DOCUMENTS

WO    WO 01/78010 A2    10/2001

OTHER PUBLICATIONS

Yao et al. ("3D Colonic Polyp Segmentation Using Dynamic Deformable Surfaces," Proceedings of SPIE vol. 5369, 2004, pp. 280-289).*

(Continued)

*Primary Examiner*—Yubin Hung
(74) *Attorney, Agent, or Firm*—Cantor Colburn LLP (57) ABSTRACT

A method for automatically segmenting image data of an object includes selecting a seed, creating an initial surface around the seed, preprocessing the image data, running a deformable surface algorithm on the image data and post processing the image data. Selecting the seed includes at least one of selecting one seed point within the object, selecting two seed points within the object with one seed point being selected at an upper end of the object and the other seed point being selected at a lower end of the object if the object is a first organ, and selecting a curved segment within the object if the object is a second organ.

27 Claims, 7 Drawing Sheets

U.S. PATENT DOCUMENTS

2006/0251302 A1* 11/2006 Abufadel et al. ............ 382/128

OTHER PUBLICATIONS

Miller et al. ("Geometrically Deformed Models: A Method for Extracting Closed Geometric Models from Volume Data," Computer Graphics, vol. 25, No. 4, Jul. 1991, pp. 217-226).*

Shen et al. ("Tracing Based Segmentation for the Labeling of Individual Rib Structures in Chest CT Volume Data," 7th Int'l Conf. Medical Image Computing and Computer Assisted Intervention, Sep. 2004).*

Yao et al. ("Automatic Segmentation of Colonic Polyps in Ct Colonography Based on Knowledge-Guided Deformable Models," Proceedings of SPIE vol. 5031, 2003, pp. 370-380).*

McInerney et al. ("Topology Adaptive Deformable Surfaces for Medical Image Volume Segmentation," IEEE Transaction on Medical Imaging, vol. 18, No. 10, Oct. 1999, pp. 840-850).*

* cited by examiner

METHOD AND SYSTEM FOR AUTOMATICALLY SEGMENTING ORGANS FROM THREE DIMENSIONAL COMPUTED TOMOGRAPHY IMAGES

BACKGROUND OF THE INVENTION

The present invention relates generally to image systems and, more particularly, to systems and methods for segmenting an organ in a plurality of images.

During clinical diagnosis, a patient's internal anatomy is imaged to determine how a disease has progressed. An infected tissue (such as tumor mass) shows some differences from a normal tissue. Also, the patient may have some type of individual differences or abnormalities regarding even healthy tissues.

Several modalities are used to generate images of the patient's internal anatomy or functionality, suitable for diagnostic purposes, radiotherapy treatment, or for surgical planning. Exemplary modalities include conventional X-ray plane film radiography; computed tomography ("CT") imaging, magnetic resonance imaging ("MRI"); and nuclear medicine imaging techniques, such as positron emission tomography ("PET") and single photon emission computed tomography ("SPECT").

In a case of radiation treatment ("RT") planning, CT imaging is generally used because an image pixel gray value (Hounsfield Units) is a direct function of a radiation dose calculation. A CT image is three dimensional (3D), more precisely, the CT image is a collection of adjacent transaxial two dimensional (2D) slices. Clinicians undertake a process of recombining anatomical elements of 2D slices to form a 3D object or an organ to get anatomical data about the patient being treated. The process of recombining anatomical elements as stated above is usually termed a reconstruction.

RT planning typically involves, clinicians such as, for example, radiologists, dosimetrists or radiotherapists, tracing outlines of a few critical structures on a number of image slices. Manually tracing the outlines on a contiguous set of 2D slices and then combining them can be time consuming and labor intensive. Time and labor increase significantly both as the number of image slices increase, and as a number and size of an organ, tumor, etc. in an anatomical area of interest increases. Quality of the outlining and quality of a produced 3D object depend on a resolution and contrast of the 2D slices, and on knowledge and judgment of the clinician performing the reconstruction.

Using an automated image segmentation could save time and labor that would otherwise be needed if using manual tracing. Also, automated image segmentation could increase precision (intra-operator repeatability and inter-operator reproducibility) by eliminating subjectivity of the clinician.

Automated image segmentation of organs in the abdominal region faces certain challenges. Abdominal organs such as, for example, a spleen, a kidney, and a liver, are located in a soft tissue environment wherein while parts of their boundary have good contrast resolution against surrounding structures others have poor contrast. For example, in most cases, the left kidney is touching the spleen in some slices and the right kidney is touching the liver. An intensity difference between each organ is very small. A very small intensity difference causes separation of each organ, if "touching" slice images are contained within the region of interest (ROI), to be very difficult and, in some cases, impossible. Additionally, between acquisitions of the slice images, abdominal organs are displaced by respiratory motion, resulting in significantly jagged outlines in planes tilted relative to a plane of the slice image.

Characteristics of abdominal organs also change from patient to patient including for example, shape, size and location of the organ. Imaging parameters of CT machines vary as well. Thus, it is desirable to obtain a method to obtain automatically segmented image data of abdominal organs.

BRIEF DESCRIPTION OF THE INVENTION

Exemplary embodiments of the invention include a method for automatically segmenting image data of an object. The method includes selecting a seed, creating an initial surface around the seed, preprocessing the image data, running a deformable surface algorithm on the image data and post processing the image data. Selecting the seed includes at least one of selecting one seed point within the object, selecting two seed points within the object with one seed point being selected at an upper end of the object and the other seed point being selected at a lower end of the object if the object is a first organ, and selecting a curved segment within the object if the object is a second organ.

Further exemplary embodiments of the invention include a method for deforming an image surface for finding a boundary of an object for use during automatic segmentation of image data of the object. The method includes iteratively computing a resultant force to apply to vertices of an initial surface of the object until an energy function is minimized. Iteratively computing the resultant force comprises linearly combining an image force, a local move force, and a smoothing force. The energy function is minimized in response to one of either reaching a predetermined number of iterations and moving of the vertices stops.

Another exemplary embodiment of the invention includes a computer program product for automatically segmenting image data of an object. The product includes a storage medium, readable by a processing circuit, storing instructions for execution by the processing circuit for selecting a seed, creating an initial surface around the seed, preprocessing the image data, running a deformable surface algorithm on the image data, and post processing the image data. Selecting the seed includes at least one of selecting a seed point within the object, selecting two seed points within the object, one seed point being selected at an upper end of the object and the other seed point being selected at a lower end of the object if the object is a first organ, and selecting a curved segment within the object if the object is a second organ.

Still another exemplary embodiment of the invention includes a system for automatically segmenting image data of an object. The system includes an imaging system configured to generate a set of slices comprising image data of the object, and a controller. The controller is configured to select a seed, create an initial surface around the seed, preprocess the image data, run a deformable surface algorithm on the image data, and post process the image data. The seed being selected comprises at least one of a seed point within the object, two seed points within the object, one seed point being selected at an upper end of the object and the other seed point being selected at a lower end of the object if the object is a first organ, and a curved segment within the object if the object is a second organ.

Yet another exemplary embodiment of the invention includes a method of constructing a rib cage for use in automatically segmenting image data of an object. The method includes performing a first phase of constructing the rib cage including thresholding the image data at a value that separates bony segments from soft tissue, then determining three dimensional connected components having high pixel values and discarding components having a size smaller than a predetermined size, reducing a number of pixels to be processed and performing a second phase of constructing the rib cage including binding ribs vertically on each coronal slice, and reducing a number of pixels to be processed and performing a third phase of constructing the rib cage including binding ribs horizontally on each transaxial slice.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

Although a detailed description of a method and system for automatically segmenting abdominal organs from three dimensional (3D) images follows, it will be appreciated by one skilled in the art that the method and system that follow are also suitable for segmenting other organs, especially organs located in a soft tissue environment.

An embodiment of the invention may be embodied in the form of computer-implemented processes and apparatuses for practicing those processes. The present invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to automatically segment abdominal organs from 3D images.

Figure 1:
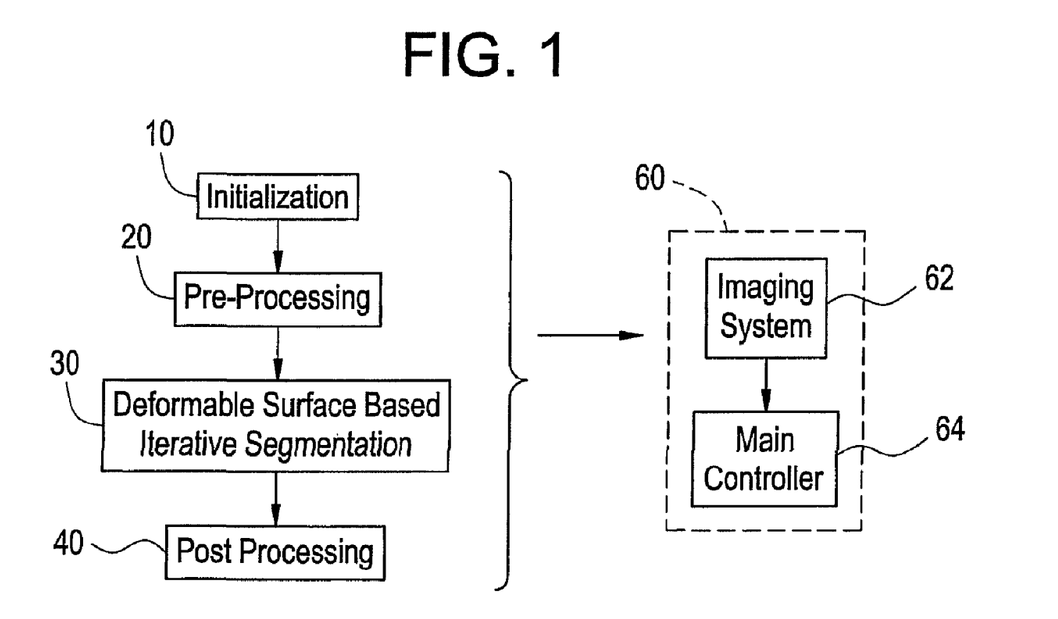
FIG. 1 is a block diagram illustrating a method for automatically segmenting abdominal organs and a system for performing the method according to an exemplary embodiment.

FIG. 1 is a block diagram illustrating a method and system for automatically segmenting abdominal organs from 3D images according to an exemplary embodiment. Abdominal organs for which this method is used include but is not limited to a liver, a kidney and a spleen. The method includes an initialization 10, a pre-processing 20, a deformable surface based iterative segmentation 30, and a post processing 40. The method may be performed by a system 60. The system 60 includes an imaging system 62 and a main controller 64. Examples of imaging system 62 include a camera, an X-ray plane film radiography system, a computed tomography (CT) imaging system, a magnetic resonance imaging (MRI) system, and a nuclear medicine imaging system. The imaging system 62 is used to acquire a set of slices of images. Main controller 64 receives the set of slices from the imaging system 62 and executes the automatically segment abdominal organs from 3D images.

Figure 2:
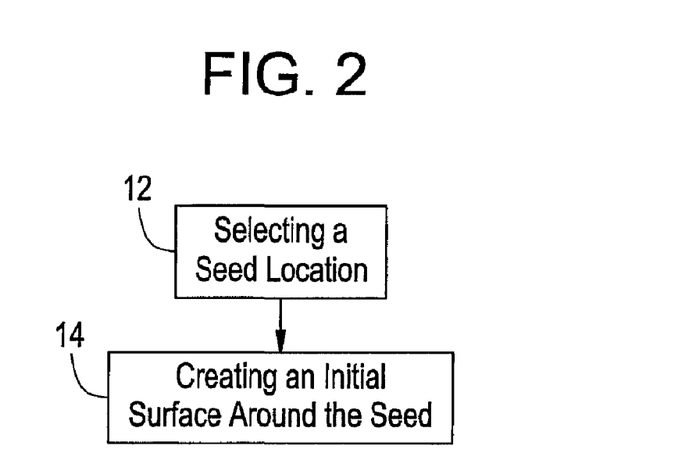
FIG. 2 is a block diagram illustrating in detail the initialization according to an exemplary embodiment.

FIG. 2 is a block diagram illustrating in detail the initialization 10. Step 10 includes selecting a seed location 12 inside an organ, and creating an initial surface around the seed 14. When selecting a seed location 12, a user may select either a point or a curved segment if, for example, the liver or spleen is to be segmented. If, for example, the kidney is to be segmented, the user may select two seed points in the middle of a parenchyma. One seed point is selected at an upper end of a kidney parenchyma and another seed point is selected at a lower end of the kidney parenchyma. Creating the initial surface around the seed 14 includes either selecting the initial surface to be an icosahedron or a tube that is thin and closed. Selecting the initial surface to be the icosahedron approximates a small sphere or balloon around the point selected by the user. Selecting the initial surface to be the tube that is thin and closed is used when segmentation is started from the curved segment.

Figure 3:
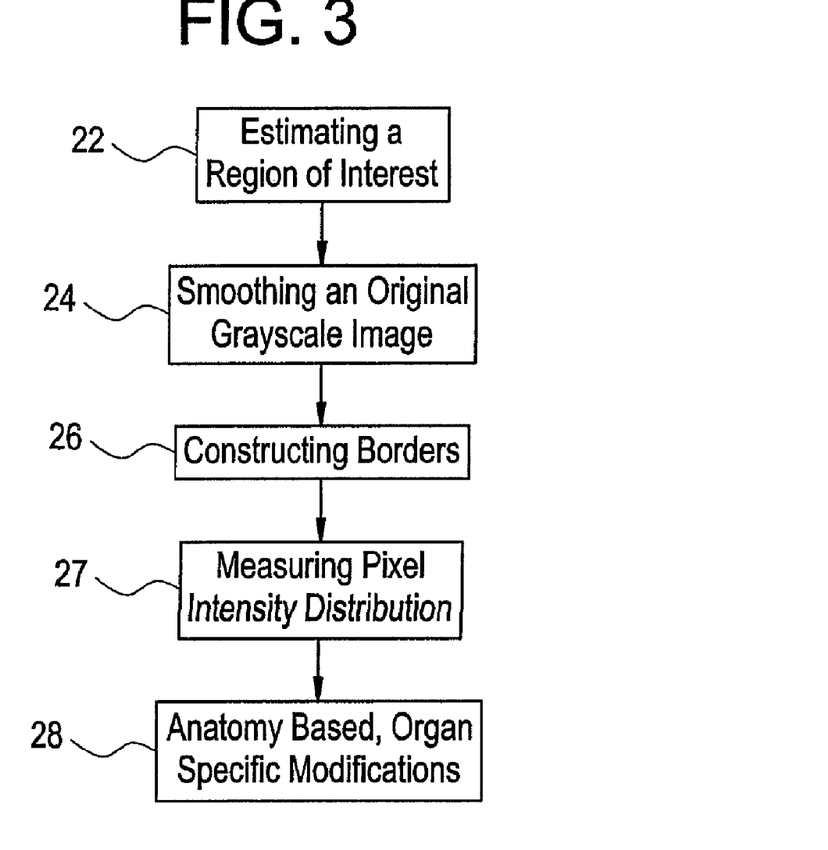
FIG. 3 is a block diagram illustrating in detail pre-processing according to an exemplary embodiment.
Figure 4:
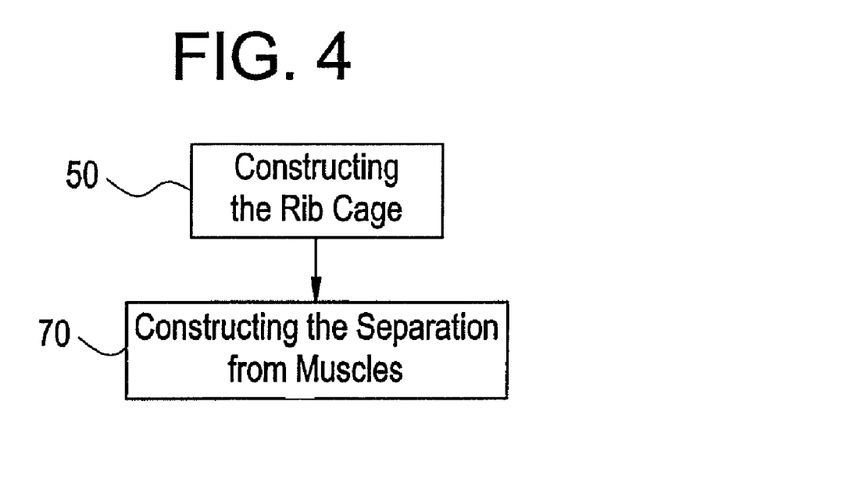
FIG. 4 is a block diagram illustrating in detail constructing borders according to an exemplary embodiment.
Figure 5:
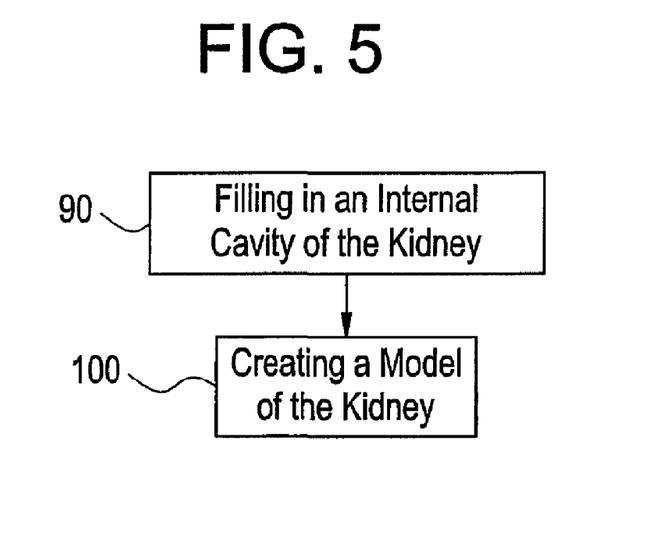
FIG. 5 is a block diagram illustrating in detail anatomy-based, organ specific modifications according to an exemplary embodiment.

FIG. 3 is a block diagram illustrating in detail the preprocessing 20 according to an exemplary embodiment. Preprocessing 20 includes estimating a region of interest (ROI) 22, smoothing an original grayscale image 24, constructing borders 26, measuring pixel intensity distribution 27, and anatomy-based, organ specific modifications 28. Estimating the ROI 22 includes selecting the ROI that is expected to mostly contain the organ to be segmented. The ROI can be either a rectangle if, for example, the liver or the spleen is to be segmented, or an ellipsoid if, for example, the kidneys are to be segmented. The ROI limits computation of image features to image volumes where computation of values is necessary to increase a speed of processing. Additionally, if, for example, the kidneys are to be segmented, the ROI provides a visual feedback as to whether the two seed points were correctly selected. Step 24 may be done with either a Gaussian filter or an edge preserving filter to reduce noise while maintaining sharp edges. Smoothing via filtering is only performed in two dimensions. Step 26 includes constructing borders that form a physical constraint around organs located in the soft tissue environment. The borders are typically an extension of bony structures, guided by the bony structures themselves. Step 26 includes either constructing the rib cage 50 if, for example, the liver or the spleen is to be segmented, or constructing the separation from muscles 70 if, for example, the kidneys are to be segmented. As shown in FIG. 4, step 27 includes basic statistical measurement of pixel intensity distribution within an area of the initial surface around the seed. Step 28 includes, for example, filling in an internal cavity (basin) of the kidney 90 and creating a model of the kidney 100 for use in computation of a model force as shown in FIG. 5.

Constructing the rib cage 50 includes, for example, filling in gaps between ribs. Generally, muscles attached to the rib cage, such as the stomach wall, have Hounsfield intensities similar to those of the liver or the spleen; hence it is necessary to help an automated segmentation algorithm to decide where a boundary of the liver or the spleen is based on a change of intensity values. A possible means to help the automated segmentation algorithm decide a location of the boundary is the construction of the rib cage using a rib cage detection algorithm. The rib cage detection algorithm seeks to find bony segments in each slice of a volume and draw straight lines between them (introduce "artificial bone") indicating where the liver or spleen segmentation should stop thus avoiding leakage.

The rib cage detection algorithm includes nine steps performed in three phases (1+4+4 steps). The first step in each phase includes reducing a number of regions to be processed in subsequent steps.

The first phase includes thresholding an image at a value that separates bony segments and soft tissue. Thresholding the image includes setting a volume and intensity threshold that differentiates between a region of soft tissue and a region of bony segments. 3D 6-connected components of the high intensity regions, corresponding mainly to bony tissues, are determined and labeled. Components that are smaller than a predetermined volume are discarded. Discarding components smaller than the predetermined volume maintains bone and eliminates high intensity, non-bony parts such as small implants, calcifications and contrast agents. Non-bony segments such as small implants, calcifications and contrast agents are often large in 2D slices but usually have a relatively small 3D volume. The rib cage, although having 2D intersections of small sizes, forms a relatively large 3D object.

The second phase includes four steps for each 2D coronal slice to bind the rib cage vertically. First, pixels belonging to those regions above the intensity and volume threshold are examined in a slice-by-slice manner. 2D 8-connected components are determined and labeled. Regions that are smaller than a predetermined area are discarded. Thus non-2D connected intersections of the rib cage are labeled with different values even if they belong to the same 3D object. Second, a distance map and a label map are initialized using the "standard" distance algorithm proposed by Borgefors [G. Borgefors: "On Digital Distance Transforms in Three Dimensions" Computer Vision and Image Understanding, 64 (3), 268-376, 1996]. As an approximation 4-connected pixels have a distance value of 10, 8-connected but not 4-connected pixels have a distance value of 14. The approximation provides a distance value very near a Euclidean distance and allows use of integer arithmetic. For each pixel, a corresponding distance map value represents a distance of that pixel from a closest object, and a corresponding label map value specifies what the closest object (identified by label value) is. Third, for each 2D bony segment, the distance and label maps are used to determine two closest objects and a corresponding distance from the two closest objects. Fourth, straight lines are drawn to the closest point of the two closest objects from the closest point of the object if the distance between the closest points is within a predefined range. The straight lines are drawn with a preset width corresponding to the thickness of a rib.

The third phase includes the four steps of the second phase executed for each transaxial slice. The third phase binds ribs horizontally. Binding ribs both vertically on coronal slices during phase two, and horizontally on transaxial slices during phase 3, ensures that "rib ends" having relatively low intensity values (e.g. breastbone parts on transaxial slices) are not missed.

Although smoothing a volume is not necessary, smoothing could make the process faster and more reliable by decreasing a number of regions and creating larger homogeneous regions. However, smoothing an entire volume increases the running time of the rib cage detection algorithm.

Constructing the separation from muscles 70 includes running a muscle separation algorithm. Muscles attached to the rib cage and a spine have Hounsfield intensities similar the kidney making it difficult to differentiate between the kidney and the muscles in an image. Creating 'artificial bone' between the spine and a nearest rib can help the automated segmentation algorithm to identify boundaries of the kidney. The artificial bone is created by finding a nearest bony segment to the kidney in each slice and drawing a quarter of a circle indicating where kidney segmentation should stop thus avoiding leakage.

The muscle separation algorithm assumes that two seed points are (manually) selected in the kidney parenchyma, one seed point in the upper end of the kidney and the other seed point at the lower end of the kidney. Both points appear in a center region of the kidney on an axial slice. The muscle separation algorithm includes the following steps. First, thresholding an image at a value that separates bony segments and soft tissue. 3D 6-connected components of the high intensity regions, corresponding mainly to bony tissues, are determined and labeled. Components that are smaller than a predetermined volume are discarded. Discarding components smaller than the predetermined volume maintains bone and eliminates high intensity, non-bony parts such as small implants, calcifications and contrast agents. Second, for each 2D coronal slice, pixels belonging to those regions above an intensity and volume threshold are examined in a slice-by-slice manner. 2D 8-connected components are determined and labeled. Regions that are smaller than a predetermined area are discarded. Thus, non-2D connected intersections of the rib cage are labeled with different values even if they belong to the same 3D object. Third, repeat the following for each kidney slice: 1) a center point of a circle is set to the connecting segment between the two seed points. 2) a radius of the circle is a distance between the center point and a nearest bone. The nearest bone is found by creating a temporary slice, and making a maximum inputted projection (MIP) of labeled pixels from the second step, within a predefined distance. 3) Re-positioning the center point to a direction of body outline, if many low intensities, such as connective tissues, are found nearby. Fourth, resultant circle positions and radii are smoothed between slices, with weight 1:2:1. Fifth, draw a portion of the circle. A one quarter portion of the circle is drawn at a left kidney and another one quarter portion of the circle is drawn at a right kidney.

Although smoothing a volume is not necessary, smoothing could make the process faster and more reliable by decreasing a number of regions and creating larger homogeneous regions. However, smoothing an entire volume increases the running time of the muscle separation algorithm.

Figure 6:
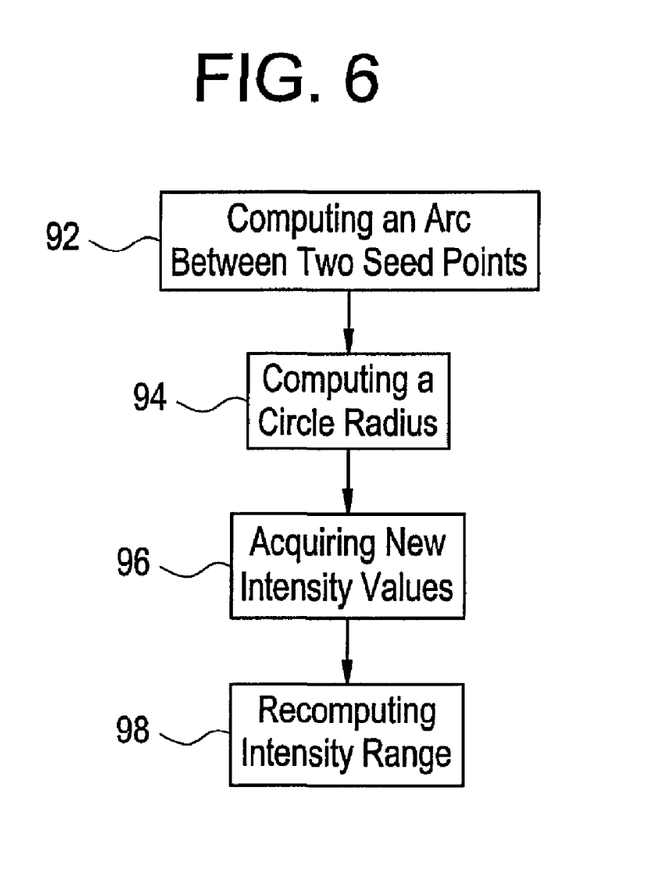
FIG. 6 is a block diagram illustrating in detail filling in an internal cavity of a kidney according to an exemplary embodiment.

As stated above, anatomy-based, organ specific modifications 28 include, for example, filling in the internal cavity (basin) of the kidney 90 and creating a model of the kidney 100 for use in computation of the model force. FIG. 6 is a block diagram illustrating in detail filling in an internal cavity of the kidney 90 according to an exemplary embodiment. Step 90 includes running an internal cavity filling algorithm. The internal cavity or basin of the kidney has different Hounsfield intensities than the parenchyma of the kidney (dark gray versus light gray). Radiologists are not consistent about segmenting the internal cavity of the kidney, however, automated methods of segmenting typically do not include the internal cavity. The internal cavity often disturbs segmentation of the parenchyma due to its large size in comparison to the parenchyma. Thus, step 90 includes computing an arc between the two seed points at 92, computing a circle radius at 94, acquiring new intensity values at 96, and recomputing intensity range at 98. At step 92, the arc between the two seed points is computed such that a curvature of the arc follows a curvature of the internal cavity in a top to bottom direction. The arc serves as a center of the tube that is thin and closed. The curvature of the arc is determined statistically from a large set of manually segmented kidneys, while the orientation depends on whether the left or right kidney is to be segmented. At step 94, the circle radius or the tube is computed from each center point of the tube on subsequent axial slices, thereby creating a set of circles. The set of circles defines the tube. Subsequent circle radii are determined statistically from a large set of manually segmented kidneys. At step 96, intensity values of voxels within the tube are changed to intensity values corresponding to kidney parenchyma. Parenchyma intensity range is computed from the statistics around the two seed points of the kidney to be segmented so as to tolerate intensity variations due to individual acquisitions. New intensity values within the tube are taken randomly from the parenchyma intensity range to avoid construction of a weak internal border. After filling the internal cavity, parenchyma intensity range is re-computed at step 98 to avoid bias due to filling the internal cavity, thereby resulting in more stable statistics.

Because parenchyma intensity range is very similar to the intensity range of surrounding organs, it is difficult to separate the parenchyma from surrounding organs statistically. In addition, the kidney has a relatively small size compared to the surrounding organs. As a consequence, automated segmentation methods that use intensity values, often tend to spread over (leak) to the neighboring organs. To stop spreading or leakage a model of the kidney is constructed at step 100, taking into account high variability of kidney size, orientation and shape.

Step 100 includes the kidney model construction algorithm, which assumes the two seed points have been selected as stated above. A center line of the model of the kidney is the same as the center line of the tube used in filling the internal cavity. A border of the model of the kidney is an ellipse on every slice, which gives a good estimate to a border of the kidney. Size of each ellipse follows the shape of the kidney in the top to bottom direction and is computed in consideration of a radius of the tube. Orientation of each ellipse is determined statistically from a large set of manually segmented kidneys, and depends on whether the left or right kidney is to be segmented.

The deformable surface based iterative segmentation 30 is an iterative process with a goal of segmenting a 3D object, for example an organ. The iterative process includes running a deformable surface algorithm. The principle of the deformable surface based iterative segmentation 30 is that a surface will form a boundary in a segmented volume when a placement and a shape of the boundary minimizes an energy function. The iterative process starts from a surface that is an initial surface of the 3D object. During each iteration step, at each vertex of the surface, various forces are applied to push vertices until either all vertices stop moving considerably or a predefined number of iterations is reached. A closed surface results, where moving of vertices is stopped at apparent edges of an image but not at image noise, and the surface separates the segmented object from the rest of the image.

The boundary of the object or volume to be segmented is one of many local minima of an energy function. The energy function contains a combination of three types of energies: 1) Internal energy, which is supposed to make the surface smooth, as it contains a speed of parameters along the surface (in other words, elasticity of the surface) and an acceleration of parameters along the surface which is related to the curvature of the surface. 2) Image energy, which is low near desired features of the image and high everywhere else. For example, a negative image gradient norm function is low near edges (fast changing parts) of the image. The image energy attracts the surface to the edges of the image. 3) Constraint energy, which comes from user interaction or other information, not contained in image data itself. For example, if a user picks a point inside the volume to be segmented, then the constraint energy may be a distance or a negative distance of a surface point from $x_0$, which either attracts the surface toward $x_0$ or repels the surface from $x_0$.

Because the image is displayed as points on a grid, implementation of the deformable surface algorithm includes discretization of the surface. Discretization may be accomplished by, for example, spline or linear interpolation. In an exemplary embodiment, discretization is performed using topology adaptive surfaces (T-surfaces), which employ an affine cell image decomposition (ACID) framework. Thus, for example, discrete forces are applied on each boundary point and an equilibrium of the discrete forces is sought.

The ACID enables deformable contours and surfaces to flow or grow into complex geometries, even modifying their topology as necessary. T-surfaces work like conventional active surfaces with an additional re-parameterization process aided by the ACID.

During each iteration step, at each contour point various forces are applied until all contour points stop moving considerably or a predefined number of iterations is reached. A resultant force is computed as a linear combination of an image force, a local move force, and a smoothing force. Pixel threshold is incorporated into the local move force as described below. Pixel threshold is also used in a condition that determines what fraction of a computed resultant step is actually applied to a vertex.

The image force is an approximation of a second gradient of an intensity function. The image force is independent of contour; therefore, both the image force and an effect of the image force on the surface may be computed before starting the iterative process. Image force is calculated by first computing an image energy as a negative gradient magnitude of the image. For example, convolve the image with the x, y, z derivatives of a Gaussian function with given standard variation. Second, determine the image force by computing a normalized gradient, x, y, z derivatives for example, of the image energy. To save computation time, image force is not computed beforehand for the entire image, but only for a ROI that is expected to mostly contain the object to be segmented. Other values are computed "on-the-fly" as they are needed and are stored for subsequent use.

The local move force is used for inflation or deflation of a model of the object to be segmented. At each iteration step, a point moves one unit in a direction of a resultant vector of normals of neighboring faces of the given point. Assume that $l$ is the number of neighbors of vertex P and an ordering of P's neighbors $P_1, P_2, \ldots, P_l$ is chosen so that a formula below gives a normal pointing to an outside direction with respect to the surface of the object to be segmented. The normal $n_j$ of a face given by a point P and two of its adjacent edge neighbors $P_j$ and $P_{j+1}$ is computed as:

$$n_j = \frac{(P_j - P) \times (P_{j+1} - P)}{\|(P_j - P) \times (P_{j+1} - P)\|}.$$

For the wraparound of neighbors, $P_{l+1}$ is assumed to be $P_l$. The resultant vector n is then a normalized sum of normal vectors:

$$n = \frac{1}{l} \sum_{j=1}^{l} n_j$$

A function of intensity values around the vertex is used to control direction and strength of the local move force. An initial assumption is that inflation of the model of the object to be segmented is needed to reach equilibrium. If the vertex is located in a "probable object region", local move becomes inflation; however, if the vertex is located in "probable background region", local move becomes deflation. In other words, the local move force is multiplied by either a negative or a positive value, depending on an image intensity of an appropriate vertex.

Figure 7:
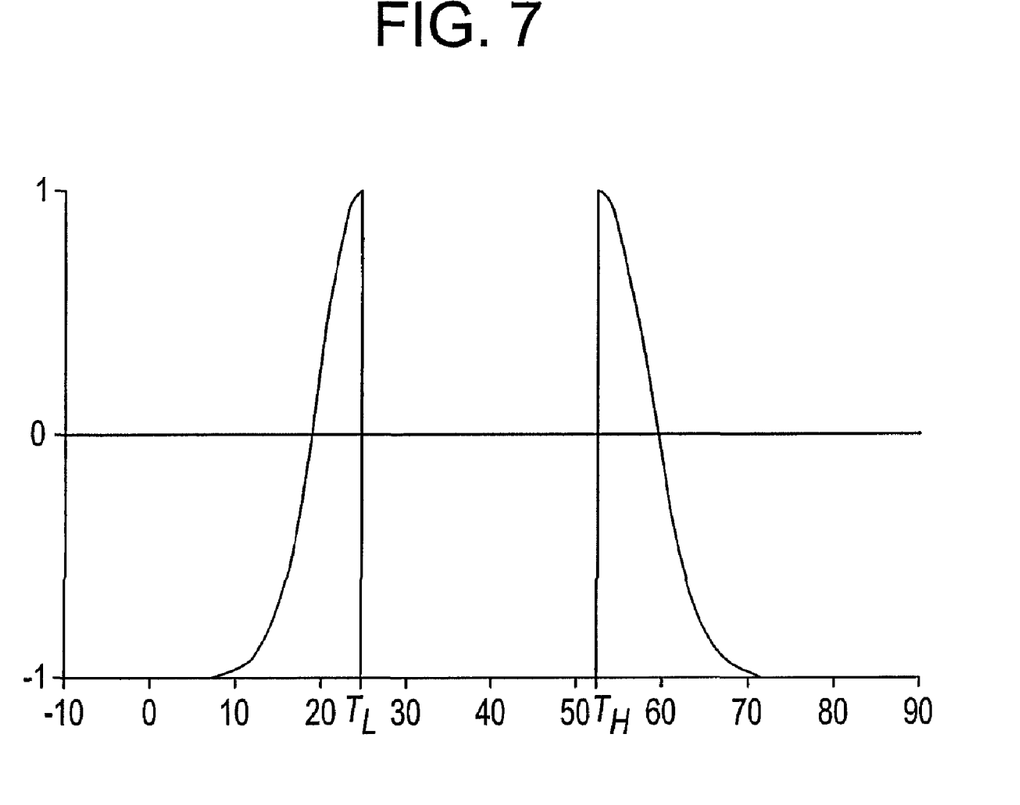
FIG. 7 is an illustration of a pixel threshold according to an exemplary embodiment.

Determination of pixel threshold includes examining a given region around a seed point and computing a modus value of neighboring points (m). Then upper (usd) and lower (lsd) standard deviation with respect to m is computed. An "acceptable range" is determined by the interval: $[T_L, T_H]$= $[m-w_1*lsd, m+w_1*usd]$, where $w_1$ is a fixed factor. Pixels having intensity between $T_L$ and $T_H$ are considered to be belonging to the object to be segmented and an energy assigned to the pixels is 1. Pixels having intensity below $T_L$ are giving less weight according to a left-side of the Gaussian function with mean $T_L$ and a certain variance, computed as $w_2*lsd$, that specifies a tolerance on a left side of the acceptance range. Pixels having intensity above $T_H$ are giving less weight according to a right-side of another Gaussian function with mean $T_H$ and another variance, computed as $w_2*usd$, that specifies a tolerance on a right side of the acceptance range. This transfer function is scaled and shifted so that the minimum weight is −1. An illustration of the pixel threshold of an exemplary embodiment is shown in FIG. 7.

The smoothing force is used to keep the shape of the object to be segmented smooth. A curvature of the object to be segmented is discretely measured. Any deviation in the curvature of the object from 0 is penalized. To measure the curvature, the distance from a point to an average of a "face" is computed and divided by a diameter of the face. Adjacent points to the point represent the face. Each point is then moved toward a center of gravity of adjacent points that resemble the base of a pyramid. As a side-effect, the smoothing force evenly spaces the vertices on the surface of the object to be segmented.

For each point P on the surface, an average S of the adjacent points $P_1, P_2, \ldots P_n$ is computed as:

$$S = \frac{1}{n} \sum_{i=1}^{n} P_i.$$

The smoothing force is proportional to a distance of point P from an average of the adjacent points:

$$d = \|P - S\|$$

A correction may be applied to ensure that values and directions of the image force, the local move force, and the smoothing force are in good proportion to each other. If actual position of a vertex that is about to move is in the acceptable range and an angle of the local move force and the sum of angles of all other forces is less than 90 degrees, then the local move force is set to a zero vector.

The resultant force is determined by linearly combining the image force, the local move force, and the smoothing force. The resultant force at each vertex point is then smoothed as a weighted average of the resultant forces of neighboring vertices and the vertex itself. Finally, a relaxation coefficient is applied to the resultant force, which has been smoothed, ensuring that only small steps are applied at a time and the surface does not undergo large changes in one step.

After a certain number of iterations of the deformation surface algorithm, a model of the object needs to be re-parameterized in order to maintain a compact and efficient representation of the surfaces of the object. Re-parameterization is achieved by approximating the deformed surface with a new triangle mesh, which is obtained by using a T-surface algorithm. The ACID grid is applied, intersections are determined between surface elements and the ACID grid and a new surface is created by using the intersection points as new vertices. For an illustration see FIG. 8.

Figure 8:
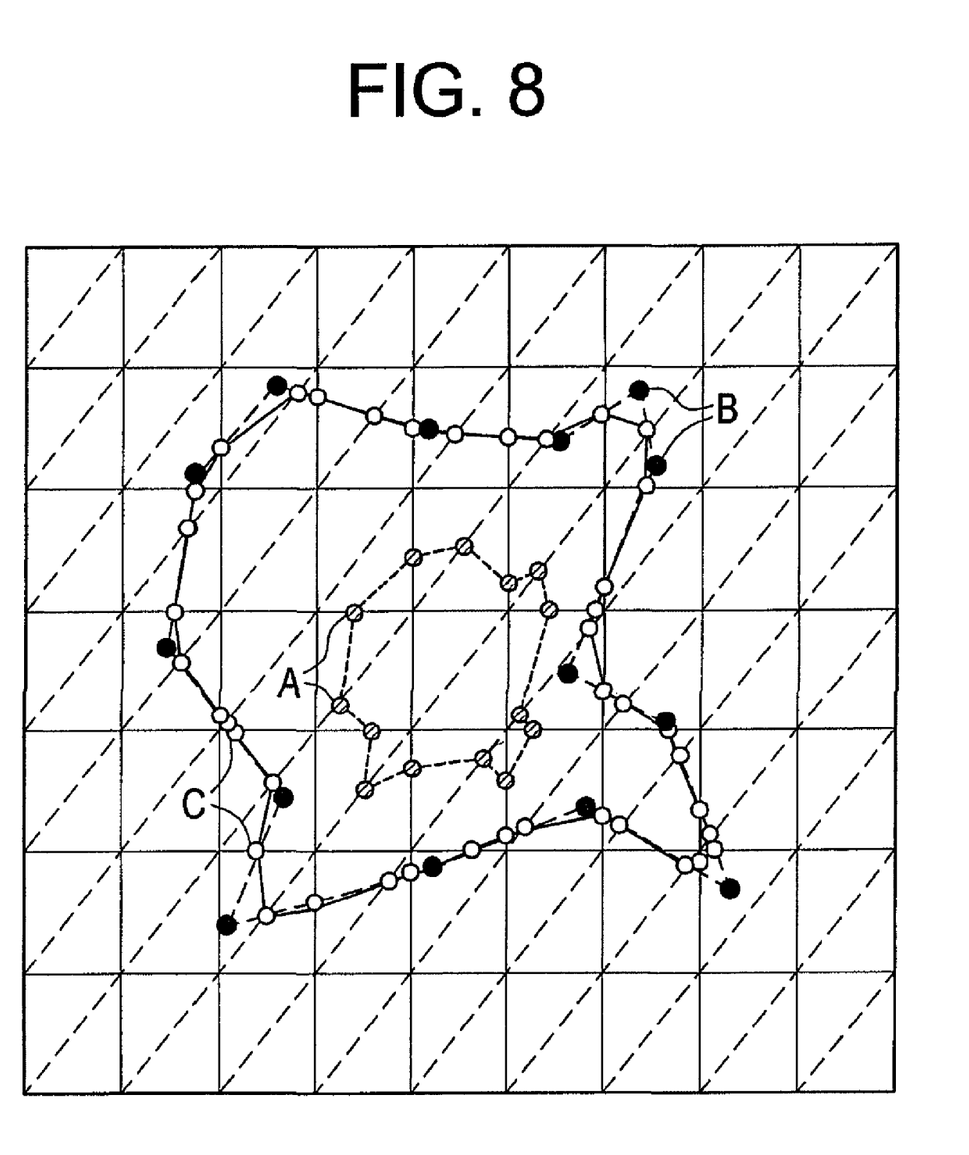
FIG. 8 is an illustration of an affine cell image decomposition (ACID) grid and re-parameterization according to an exemplary embodiment.

FIG. 8 is an illustration of the ACID grid and the re-parameterization in 2D. 'A' shows the initial surface before deformation. The vertices of the initial surface 'A' are moved (the surface is deformed) and become surface 'B' marked by black disks connected by the black dotted lines. Clear circles 'C' mark intersection points between the deformed surface and the ACID grid. The intersection points 'C' become vertices of the re-parameterized surface, marked by the solid black lines.

First, the surface is laid over a special tetrahedral mesh and intersections of surface elements (triangles) and the mesh (tetrahedron edges) are determined. Then with certain simplification a new triangle mesh is created wherein new vertices will be intersection points found above and new triangles will be created such that in one tetrahedron (mesh cell) there is at most one new surface element (or more precisely, either zero, or one triangle, or a special pair of triangles).

Finally, a scan-line algorithm is used to identify and fix surface patches on the new surface. The intersection points between the new surface and the ACID are computed as follows.

Scan-lines are cast according to the ACID grid, and intersections between the scan-line and the surface elements (i.e., triangles) are computed and stored for the scan-line. Each intersection point is assigned a label indicating an orientation of the surface element at that point, that is, the cast line may hit the surface element from the inside of the object or from the outside. Since the order in which the surface elements are processed is arbitrary, intersection points stored for one scan-line need to be sorted by their distance from one end of the scan-line before further processing is done. Traversing the intersection points along a scan-line, a flag with value either INSIDE or OUTSIDE is assigned to each grid point according to the number of intersection points traversed so far and the orientation of the surface elements at those points. Finally, a grid point is labeled INSIDE if it would be labeled INSIDE according to all scan-lines.

If for some reason the scan-lines do not agree on labeling a grid point, corrections are made to grid and scan-line data structures. Corrections are achieved by dropping intersection points from scan-lines if they turn out to disagree with the INSIDE-OUTSIDE labeling, or new points may be inserted at certain places for similar reasons. Points may either be dropped or inserted, whichever results in fewer artificial changes to the grid and scan-line data structures.

Figure 9:
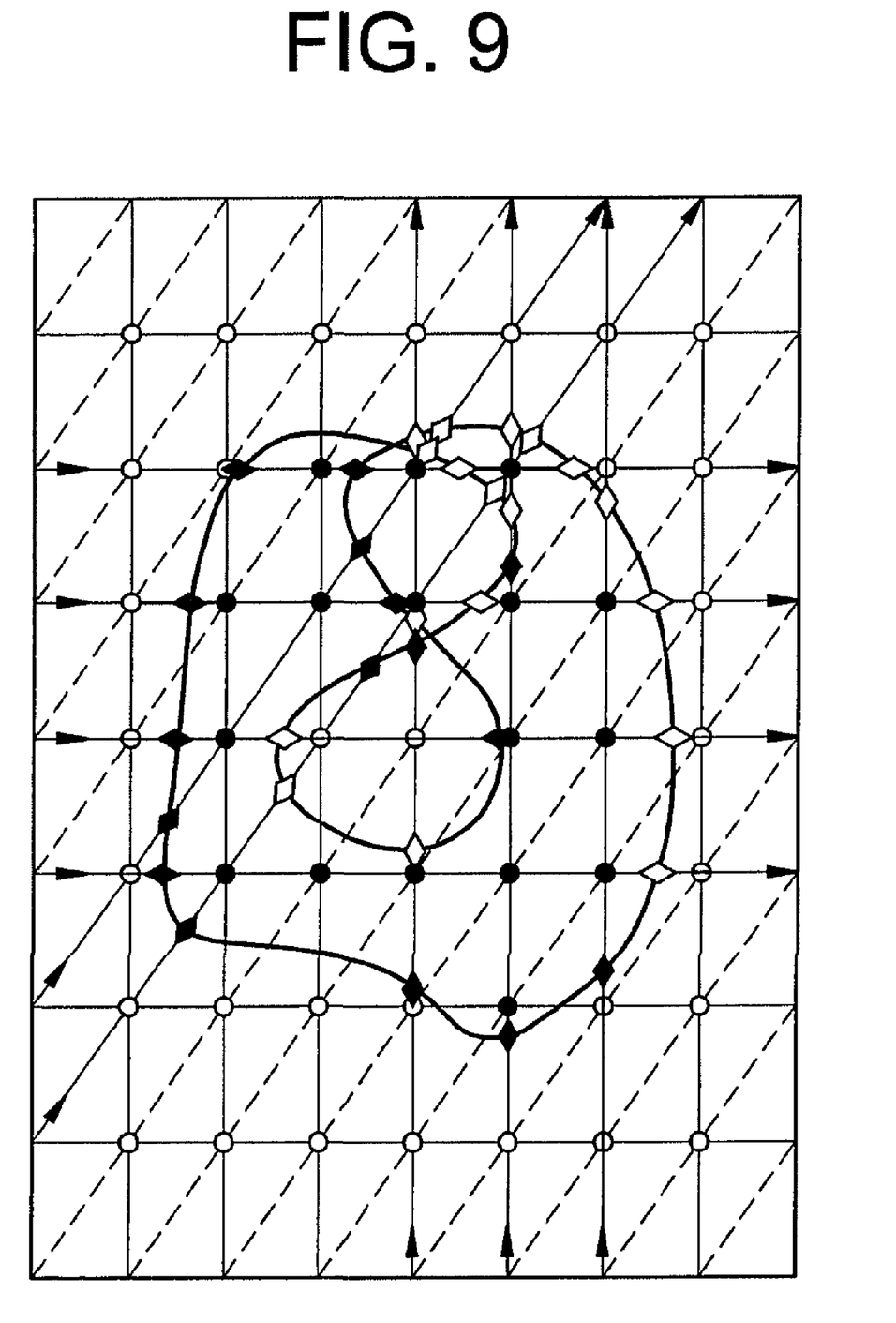
FIG. 9 is an illustration of the scan-line algorithm according to an exemplary embodiment.

FIG. 9 is an illustration of the scan-line algorithm according to an exemplary embodiment. A solid black curve shows a deformed surface of an object. Solid straight lines with arrows at both ends show some of the scan-lines along the grid lines. Black disks mark grid points inside the object and clear circles mark grid points outside the object. Intersection points between the deformed surface and the scan-lines are marked by rhomboids. Black rhomboids mark inside points (the scan-line crosses the contour towards the inside of the object), and clear rhomboids mark outside points (scan-line crosses the contour from the inside out). Vertices of the re-parameterized (simplified) surface will be selected from points marked by rhomboids.

If there are multiple intersection points on one grid edge along a scan-line, at most one point is kept. This results in simplification of the surface where too much deformation took place within one grid cell. When complete, there are either zero, three or four intersection points of well defined configurations on the edges of each grid cell. Zero means that the surface does not intersect the grid cell. A valid occurrence of three intersection points occurs when the three intersection points are on three edges of the tetrahedron that intersect in one vertex. Four intersection points may be on four edges of the tetrahedron if no three of them make up a triangle (i.e., two pairs of skew edges). As a result, zero, one, or two new triangles are created from the intersection points. The new triangles will form the re-parameterized surface. When four points are kept, it is possible to create two different pairs of triangles from them. The scan-line algorithm selects that pair which is obtained by drawing the shorter diagonal.

As previously mentioned, the deformable surface based iterative segmentation 30 aims to find a minimal energy state based on external (image) and internal (surface) features. We use the iterative gradient method, where several forces push surface vertices toward a minimum state. Forces are usually computed in each deformation step, the only exception is image force, which can be computed in advance for the estimated ROI.

There are several (usually three) runs. In all runs, deformation steps are interleaved with re-parameterizations. In a first run a small number of deformation steps and re-parameterizations with a finer ACID are applied that allows evolution of the object initially chosen. Later, when the object becomes larger (second run), a number of deformation steps is increased and also the ACID is made coarser, thus reducing the amount of necessary storage space and computation and also helping the surface to avoid becoming too ragged. In the final (third) run, a finer ACID is applied to get high precision results. Effects of forces (e.g., local move force, smoothing force) are also changed (combining weights are modified, refined) in different runs. There is an initial re-parameterization of the starting surface before the first run. After the last re-parameterization there are some additional deformation steps to make the surface fine and precisely follow image contours.

Iteration stops if either a prescribed number of iterations were performed or the surface reaches equilibrium. A limit on number of iterations is set high enough to let the surface reach equilibrium if possible. Equilibrium is reached, if volume enclosed by the surface does not change significantly or surface vertices stop moving.

When the surface vertices stop moving, the classical approach involves a temperature method, which uses temperature assigned to each surface element and a temperature of elements is adjusted in each iteration step by considering a temperature of neighboring elements and an amount of movement of the vertices of the surface. The temperature of elements may also influence a movement of the elements. The drawback of using the temperature method is that the temperature method does not prevent oscillation and cyclic movement of the vertices of the surface. Thus, a stopping criterion using velocity information about moving vertices is used. Under the stopping criterion, each vertex is coupled with a "shadow" point that stores a position the vertex was located at during a start time. The "shadow" point is updated if the vertex moves considerably far from a previous "shadow" point or after a certain number of deformation steps. Velocity of a vertex at the start time is determined by its distance from the "shadow" point and a number of deformation steps the vertex went through since it left the "shadow" point. Thus, an average velocity may be computed for each vertex during its movement, instead of an instant velocity, and the average velocity can be used for determining the stopping criterion for the deformation algorithm. Deformation halts when an average of a computed velocity of all vertices falls below a certain threshold, meaning that there are not too many vertices that move considerably.

Figure 10:
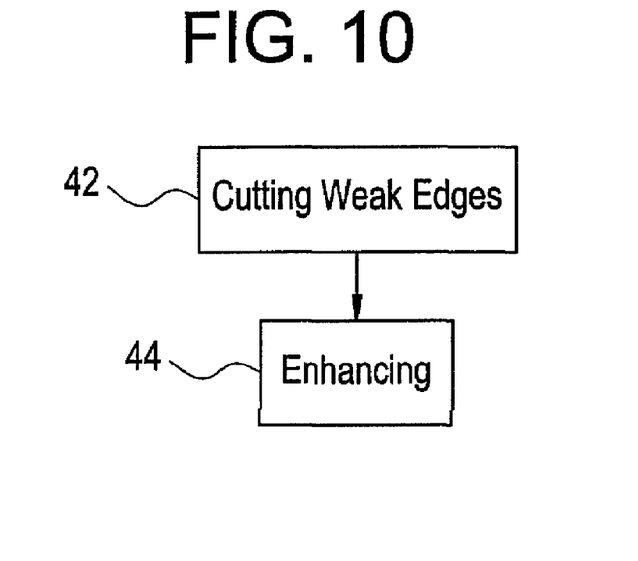
FIG. 10 is a block diagram illustrating in detail post processing according to an exemplary embodiment.

Upon completion of step 30, surfaces of the 3D object to be segmented have been manipulated to provide boundaries of the 3D object. Post processing 40 includes cutting weak edges 42 at the boundaries of the 3D object and enhancing 44, as shown in FIG. 10. The goal of post processing is to localize and cut the leaking parts of the segmented region. Points along a boundary of a segmented volume that have small gradient magnitude probably correspond to leakage and thus, should be eliminated.

The post-processing 40 works in two dimensions (2D). A weak edge cutting algorithm extracts the boundary of the segmented volume slice-by-slice. First, contour points are classified as edge or non-edge points, and then runs of non-edge points are discarded.

Figure 11:
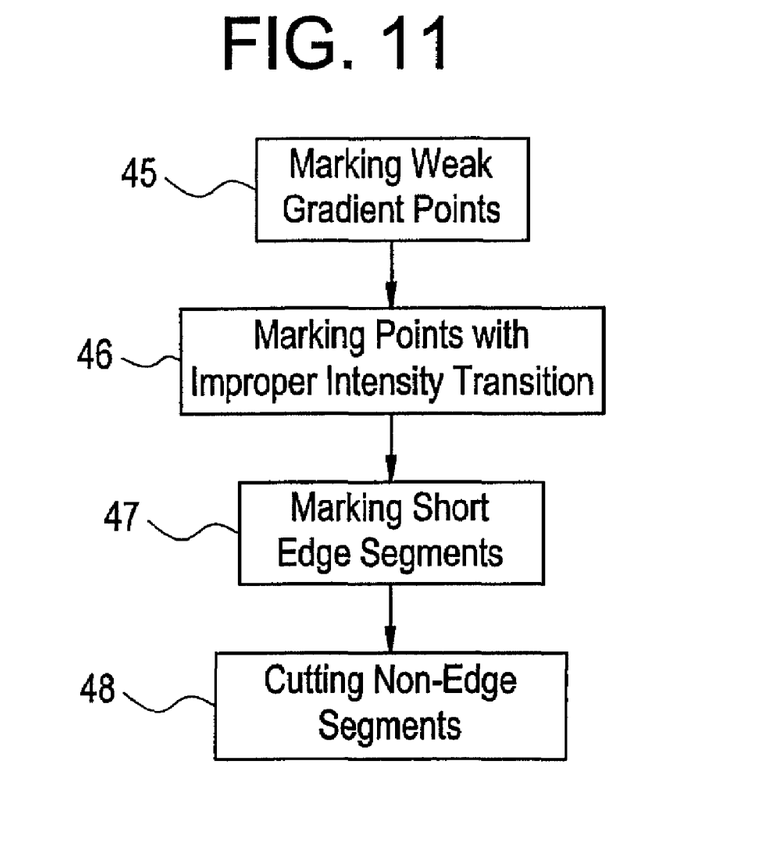
FIG. 11 is a block diagram illustrating the weak edge cutting algorithm according to an exemplary embodiment.

The segmented volume is processed in 2D on a slice-by-slice fashion. A certain amount (given by a parameter) of the lower and upper slices is not processed. FIG. 11 is a block diagram illustrating the weak edge cutting algorithm according to an exemplary embodiment. The weak edge cutting algorithm includes marking weak gradient points 45, marking points with improper intensity transition 46, marking short edge segments 47, and cutting non-edge segments 48.

Step 45 includes extracting a one-dimensional function representing the contour or chain code of a slice. The one-dimensional function assigns to each boundary point the gradient magnitude at the appropriate image pixel. The one-dimensional function is smoothed to eliminate small discontinuities in the gradient along the contour of the slice. Classification of the boundary points is performed according to the one-dimensional function, which has been smoothed. Points with small gradient (less than the pre-computed gradient threshold) are classified as non-edge points. Points with relatively high gradient are further analyzed.

Step 46 includes moving across the boundary from the inside to the outside, perpendicular to the boundary, and crossing at the point under investigation. If the transition of the image intensity is improper (e.g. a "dark->dark" or a "gray->white" transition in case of kidneys), then the point will be classified as non-edge point, otherwise it will be edge point.

Step 47 includes gathering segments built from maximal runs of edge-points and similarly from non-edge points and merging the short segments. When an analyzed contour segment is an edge segment and it is shorter then a predefined length, the segment will be turned into a non-edge segment.

Step 48 includes dropping the continuous non-edge segments on the contour. More precisely, non-edge segments are changed for a cutting straight line. Before dropping the continuous non-edge segments, joints of edge and non-edge segments are finalized: when an angle of the contour at a joint is very high, then 1-2 points of the edge segment near the joint are changed to non-edge (angle <120°: 1 point, if angle <90°, 2 points) making the junction smoother.

In order to enhance precision at step 44, an active contour algorithm is applied as a 2D counterpart of the deformable surface method, slice-by-slice. The aim of the active contour algorithm is to follow precisely the 2D boundary (maxima of gradient magnitude) on each transaxial slice. A 3D method may not be flexible enough if there are substantial changes (in shape or in intensity value) between consecutive slices; therefore slice-by-slice adjustment is necessary.

The active contour algorithm is initialized by a 2D intersected contour of a 3D shape previously resulted by the deformable surface method. Only a few iteration steps are executed. At each iteration step, at each contour point, a resultant of the image force, the local move force and the smoothing force is applied to push vertices closer to a nearest boundary. A 2D active contour that results is further processed to eliminate possible leakage or abrupt changes of shape between consecutive slices. To eliminate possible leakage, a control form is generated for each slice by shape-based interpolation of previous and succeeding slices, and then the control form is dilated. If relatively large leaking (outsider) regions exist with respect to the dilated control form, the leaking regions are cut. Contours may be smoothed on a per slice basis where each point is moved to a mid-point of its neighbors.

When the liver is to be segmented, the user selects either a seed point or curve (usually on a transaxial slice) inside the liver and segmentation is started either from a small icosahedron around the seed point or from a thin tube around the curve. Statistical measures for pixel threshold are computed within the starting surface. To increase computation speed, an ROI is estimated, and is used during filtering and gradient computation. An edge preserving filter is used to reduce noise while maintaining sharp edges, thereby smoothing the image. The gradient filter is initialized with the result of the edge preserving filter. A rib cage is determined as described above to create blocking barriers for the deformable surface near the stomach wall.

The image force, local move force and smoothing force described above are used with the following weights:
  Image force: 650
  Smoothing force: 600
  Local move force: 600
  Pixel threshold: 1.96

Precision of contours on each transaxial slice is enhanced by the 2D active contour algorithm. Contours of top slices are processed by morphological operators to smooth final results, thereby correcting zig-zag effects due to abrupt disappearance of liver, which the deformable surface cannot cope with.

When the kidney is to be segmented, a user selects two seed points inside the kidney parenchyma, one near the top and the other near the bottom part of the kidney. Perform segmentation starting from two independent icosahedra surfaces placed around the two seed points, the two independent icosahedra surfaces are merged. Statistical measures for pixel threshold are computed in a neighborhood of the two seed points. To increase computation speed, an ROI is computed from the two seed points, and is used during filtering and gradient computation.

Starting the segmentation from the two seed points avoids inclusion of the internal cavity of the kidney and gets stable statistical measurements of pixel intensities in the parenchyma. The image is smoothed with an edge preserving filter to reduce noise while maintaining sharp edges. The gradient filter is initialized with the result of edge preserving filter. Artificial bones are imposed on slices to create blocking barriers near the spine and the ribs.

The image force, local move force and smoothing force described above are used with the following weights:
  Image force: 650
  Smoothing force: 300
  Local move force: 600
  Pixel threshold: 1.96

An additional force (specific to the kidney) is also included, which is called the model force. To avoid big overflows an ellipsoid is placed around the kidney. There is a sigmoid function at every surface point of the ellipsoid; these functions give the transitions between the values of 0 and 1.0 values are inside and 1 values are outside. Placement and radii of the ellipsoid depend on the distance of the two selected seeds. A parameter determines transition of all sigmoid functions. (FIG. 5) Contour of each transaxial slice is processed to cut off leakage, enhance precision and smooth the final contours.

When the spleen is to be segmented, a user selects either a seed point or curve (for the best result on a coronal view) inside the spleen, the segmentation is started either from a small icosahedron around the seed point or from a thin tube around the curve. Statistical measures for pixel threshold are computed within the starting surface. To increase computation speed, an ROI is estimated, and is used during filtering and gradient computation. The image is smoothed with an edge preserving filter to reduce noise while maintaining sharp edges. The gradient filter is initialized with the result of edge preserving filter. The rib cage is determined to create blocking barriers for the deformable surface near the stomach wall.

The image force, local move force and smoothing force described above are used with the following weights:
  Image force: 650
  Smoothing force: 600
  Local move force: 600
  Pixel threshold: 1.96

Contour of each transaxial slice is processed to cut off leakage, enhance precision and smooth final contours.

In addition, while the invention has been described with reference to exemplary embodiments, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for automatically segmenting image data of an object, the method comprising:
    selecting a seed;
    creating an initial surface around the seed;
    preprocessing the image data by:
        estimating a region of interest;
        smoothing an original grayscale image of the object;
            constructing borders proximate to the object by:
                constructing a rib cage using a rib cage construction algorithm; and
                constructing a separation from muscles using a muscle separation algorithm comprising:
                    thresholding the image data at a value that separates bony segments from soft tissue, the image data including at least one transaxial slice, then determining three dimensional connected components having high pixel values and discarding components having a size smaller than a predetermined size;
                    examining pixels of remaining components at each transaxial slice in a slice-by-slice manner, then determining two dimensional connected components having high pixel values and discarding components having a size smaller than a predetermined size;
                    setting a center of a circle on a segment connecting the two seed points if the object is the first organ;
                    setting a radius of the circle equal to a distance between the center of the circle and a nearest bone;
                    repositioning the center of the circle in response to low intensities near the center of the circle;
                    smoothing circle positions; and
                    drawing a portion of the circle;
        measuring pixel intensity distribution within the region of interest; and
        modifying a property based on a character of the object;
    running a deformable surface algorithm on the image data;
    post processing the image data;
    wherein selecting a seed comprises:
        if the object is a first organ, selecting two seed points within the object, one seed point being selected at an upper end of the object and the other seed point being selected at a lower end of the object;
        if the object is a second organ, selecting a curved segment within the object; and
        otherwise selecting one seed point within the object; and
    wherein the above steps are performed by a processing circuit.

2. The method of claim 1, wherein creating an initial surface around the seed comprises:
    creating an icosahedron around each seed point if at least one seed point is selected; and
    creating the initial surface as a tube if the curved segment is selected.

3. A method of constructing a rib cage for use in automatically segmenting image data of an object, the method comprising:
    performing a first phase of constructing the rib cage including thresholding the image data at a value that separates bony segments from soft tissue, the image data including at least one coronal slice and at least one transaxial slice, then determining three dimensional connected components having high pixel values and discarding components having a size smaller than a predetermined size;
    reducing a number of pixels to be processed and performing a second phase of constructing the rib cage including binding ribs vertically on each coronal slice;
    reducing a number of pixels to be processed and performing a third phase of constructing the rib cage including binding ribs horizontally on each transaxial slice; and
    wherein the above steps are performed by a processing circuit.

4. The method of claim 3, wherein at least one of the binding ribs vertically on each coronal slice and the binding ribs horizontally on each transaxial slice comprises executing the following slice-by-slice:
    examining pixels of remaining components including determining two dimensional connected components having high pixel values and discarding components having a size smaller than a predetermined size;
    determining a two closest components of each component and a distance to two closest points of each component; and
    drawing straight lines to the two closest points of each component if the distance to the two closest points is within a selected range.

5. A method for automatically segmenting image data of an object, the method comprising:
    selecting a seed;
    creating an initial surface around the seed;
    preprocessing the image data by constructing a separation from muscles using a muscle separation algorithm including:
        thresholding the image data at a value that separates bony segments from soft tissue, the image data including at least one transaxial slice, then determining three dimensional connected components having high pixel values and discarding components having a size smaller than a predetermined size;
        examining pixels of remaining components at each transaxial slice in a slice-by-slice manner, then determining two dimensional connected components having high pixel values and discarding components having a size smaller than a predetermined size;
        setting a center of a circle on a segment connecting the two seed points if the object is the first organ;
        setting a radius of the circle equal to a distance between the center of the circle and a nearest bone;
        repositioning the center of the circle in response to low intensities near the center of the circle;
        smoothing circle positions; and
        drawing a portion of the circle;
    running a deformable surface algorithm on the image data;
    post processing the image data;
    wherein selecting a seed comprises:
        if the object is a first organ, selecting two seed points within the object, one seed point being selected at an upper end of the object and the other seed point being selected at a lower end of the object;
        if the object is a second organ, selecting a curved segment within the object;

otherwise selecting one seed point within the object; and
wherein the above steps are performed by a processing circuit.

6. The method of claim 5 wherein preprocessing the image data further comprises:
estimating a region of interest;
smoothing an original grayscale image of the object;
constructing borders proximate to the object by constructing a rib cage using a rib cage construction algorithm;
measuring pixel intensity distribution within the region of interest; and
modifying a property based on a character of the object.

7. A system for automatically segmenting image data of an object, the system comprising:
an imaging system configured to generate a set of slices comprising image data of the object; and
a controller that performs:
selecting a seed;
creating an initial surface around the seed;
processing the image data by constructing a separation from muscles using a muscle separation algorithm comprising:
thresholding the image data at a value that separates bony segments from soft tissue, the image data including at least one transaxial slice, then determining three dimensional connected components having high pixel values and discarding components having a size smaller than a predetermined size;
examining pixels of remaining components at each transaxial slice in a slice-by-slice manner, then determining two dimensional connected components having high pixel values and discarding components having a size smaller than a predetermined size;
setting a center of a circle on a segment connecting the two seed points if the object is the first organ;
setting a radius of the circle equal to a distance between the center of the circle and a nearest bone;
repositioning the center of the circle in response to low intensities near the center of the circle;
smoothing circle positions; and
drawing a portion of the circle;
running a deformable surface algorithm on the image data;
post processing the image data,
wherein selecting a seed comprises:
if the object is a first organ, selecting two seed points within the object, one seed point being selected at an upper end of the object and the other seed point being selected at a lower end of the object;
if the object is a second organ, selecting a curved segment within the object; and
otherwise selecting a seed point within the object.

8. The system of claim 7, wherein the first organ is a kidney and the second organ is one of a spleen and a liver.

9. The system of claim 7, wherein the controller further preprocesses the image data including:
estimating a region of interest;
smoothing an original grayscale image of the object;
constructing borders of the object;
measuring pixel intensity distribution within the region of interest; and
modifying a property based on a character of the object.

10. The system of claim 9, wherein the constructing borders comprises:

constructing a rib cage using a rib cage construction algorithm; and
constructing a separation from muscles using a muscle separation algorithm.

11. The system of claim 9, wherein modifying a property based on the character of the object comprises:
filling in an internal cavity of the first organ; and
creating a model of the first organ, the first organ being a kidney.

12. The system of claim 7, wherein post processing the image data comprises:
cutting weak edges at a boundary of the object; and
enhancing the image data.

13. A computer program product for automatically segmenting image data of an object, the product comprising:
a storage medium, readable by a processing circuit, storing instructions that, when executed by the processing circuit, perform the following:
selecting a seed;
creating an initial surface around the seed;
preprocessing the image data by constructing a separation from muscles using a muscle separation algorithm including:
thresholding the image data at a value that separates bony segments from soft tissue, the image data including at least one transaxial slice, then determining three dimensional connected components having high pixel values and discarding components having a size smaller than a predetermined size;
examining pixels of remaining components at each transaxial slice in a slice-by-slice manner, then determining two dimensional connected components having high pixel values and discarding components having a size smaller than a predetermined size;
setting a center of a circle on a segment connecting the two seed points if the object is the first organ;
setting a radius of the circle equal to a distance between the center of the circle and a nearest bone;
repositioning the center of the circle in response to low intensities near the center of the circle;
smoothing circle positions; and
drawing a portion of the circle;
running a deformable surface algorithm on the image data;
post processing the image data; and
wherein selecting a seed comprises:
if the object is a first organ, selecting two seed points within the object, one seed point being selected at an upper end of the object and the other seed point being selected at a lower end of the object;
if the object is a second organ selecting a curved segment within the object; and
otherwise selecting a seed point within the object.

14. The computer program product of claim 13, wherein preprocessing the image data further comprises:
estimating a region of interest;
smoothing an original grayscale image of the object;
constructing borders proximate to the object;
measuring pixel intensity distribution within the region of interest; and
modifying a property based on a character of the object.

15. The computer program product of claim 14, wherein constructing borders comprises:
constructing a rib cage using a rib cage construction algorithm; and constructing a separation from muscles using a muscle separation algorithm.

16. The computer program product of claim 14, wherein modifying a property based on a character of the object comprises:
   filling in an internal cavity of the first organ; and
   creating a model of the first organ, the first organ being a kidney.

17. The computer program product of claim 16, wherein filling in an internal cavity of the first organ comprises:
   computing an arc between the two seed points;
   computing a radius of a circle centered on a portion of the arc;
   constructing a tube via a series of circles having the radius;
   acquiring intensity values for voxels within the tube; and
   recomputing an intensity range.

18. The method computer program product of claim 16, wherein creating a model of the first organ includes using a kidney model construction algorithm that comprises:
   selecting a center line of a kidney model;
   assembling borders of the kidney model as a series of consecutive elliptical slices; and
   orienting the consecutive elliptical slices responsive to statistically determined orientations from data of manually segmented kidneys.

19. The method computer program product of claim 13, wherein post processing the image data comprises:
   cutting weak edges at a boundary of the object; and
   enhancing the image data.

20. The computer program product of claim 19, wherein cutting weak edges includes:
   marking weak gradient points as non-edge points;
   marking points with an improper intensity transition as non-edge points;
   creating maximum runs of edge points to be re-classified edge segments;
   creating maximum runs of non-edge points to be re-classified non-edge segments;
   marking short edge segments to be non-edge segments; and
   cutting non-edge segments.

21. The computer program product of claim 19, wherein enhancing the image data comprises applying an active contour algorithm to the image data in a slice-by-slice manner and eliminating abrupt changes between consecutive slices.

22. The computer program product of claim 13, wherein the deformable surface algorithm comprises iteratively computing a resultant force to apply to vertices of an initial surface of the object until an energy function is minimized.

23. The computer program product of claim 22, wherein the energy function is minimized when one of the following occurs:
   reaching a predetermined number of iterations; and
   moving of the vertices stops.

24. The computer program product of claim 22, wherein computing a resultant force comprises linearly combining an image force, a local move force and a smoothing force.

25. The computer program product of claim 24, further comprising linearly combining a model force which is computed based on an anatomical model of the object.

26. The computer program product of claim 25, wherein the image force is an approximation of a second gradient of an intensity function, the local move force provides for inflation or deflation of a model of the object, and the smoothing force is proportional to a distance of a point from an average of adjacent points.

27. The computer program product of claim 25, wherein computing a resultant force further comprises applying a relaxation coefficient to the resultant force.

* * * * *